United States Patent
Ernst et al.

(10) Patent No.: US 8,127,339 B2
(45) Date of Patent: Feb. 28, 2012

(54) AUTOMATIC, CONNECTION-BASED TERMINAL OR USER AUTHENTICATION IN COMMUNICATION NETWORKS

(75) Inventors: Matthias Ernst, München (DE); Tobias Stötter, München (DE); Stefan Elbs, Sigmarszell (DE)

(73) Assignee: BT (Germany) GmbH & Co., OHG, München (DE)

( * ) Notice: Subject to any disclaimer, the term of this patent is extended or adjusted under 35 U.S.C. 154(b) by 1253 days.

(21) Appl. No.: 10/539,506

(22) PCT Filed: Dec. 19, 2003

(86) PCT No.: PCT/EP03/14632
§ 371 (c)(1),
(2), (4) Date: Jan. 10, 2006

(87) PCT Pub. No.: WO2004/057824
PCT Pub. Date: Jul. 8, 2004

(65) Prior Publication Data
US 2006/0165226 A1    Jul. 27, 2006

(30) Foreign Application Priority Data
Dec. 19, 2002 (DE) ................... 102 59 755

(51) Int. Cl.
*G06F 7/04* (2006.01)
*H04L 29/06* (2006.01)
*G06F 12/14* (2006.01)
*G06F 15/173* (2006.01)

(52) U.S. Cl. ............ 726/3; 726/17; 726/21; 709/223; 379/114.01

(58) Field of Classification Search .................. None
See application file for complete search history.

(56) References Cited

U.S. PATENT DOCUMENTS

| 6,151,628 | A | * | 11/2000 | Xu et al. ................... 709/225 |
| 6,400,812 | B1 | * | 6/2002 | Svedberg et al. ........ 379/114.14 |
| 6,671,272 | B2 | * | 12/2003 | Vaziri et al. ................ 370/352 |
| 6,704,789 | B1 | * | 3/2004 | Ala-Laurila et al. ........ 709/230 |
| 2002/0022962 | A1 | * | 2/2002 | Richardson .................... 705/1 |
| 2003/0169714 | A1 | * | 9/2003 | Nakajima .................. 370/338 |

FOREIGN PATENT DOCUMENTS

| EP | 1284575 A | 2/2003 |
| JP | 10 294759 A | 11/1998 |
| JP | 2002-207929 A | 7/2002 |

\* cited by examiner

*Primary Examiner* — Nathan Flynn
*Assistant Examiner* — Trang Doan
(74) *Attorney, Agent, or Firm* — Westerman, Hattori, Daniels & Adrian, LLP

(57) ABSTRACT

The aim of the invention is to permit the automatic identification of access rights to protected areas in networks, in particular on the Internet. This is achieved by a method for automatically identifying the access rights to protected areas in a first network using a unique connection identifier of a second network, in particular in the interconnection of networks that constitutes the Internet. According to the invention: a unique identifier of the first network is dynamically or statically assigned to a terminal, during or prior to the latter's connection to the first network; a combination of at least the unique connection identifier of the second network and the unique identifier of the first network, said combination being stored in an authentication unit, is polled when the terminal requests access to the protected area, in order to determine the unique connection identifier of the second network using the unique identifier of the first network; and the existence of access rights to the protected area for the unique connection identifier of the second network is then verified.

23 Claims, 1 Drawing Sheet

Figure 1:
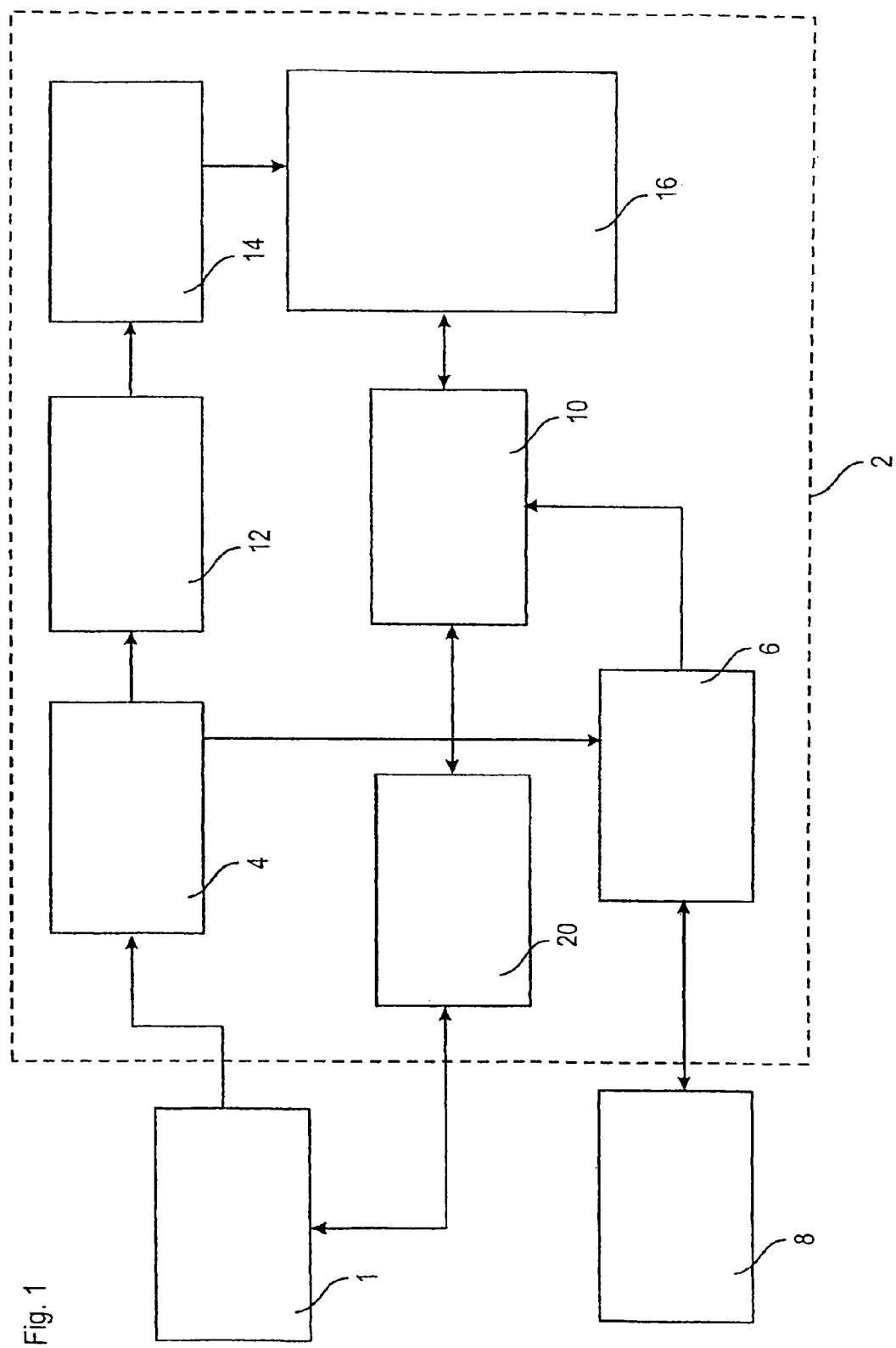

AUTOMATIC, CONNECTION-BASED TERMINAL OR USER AUTHENTICATION IN COMMUNICATION NETWORKS

This invention relates to automatic terminal or user identification in networks, in particular in the interconnection of networks that constitutes the internet, and in particular to a method for automatically identifying an access right to protected areas of networks, in particular in the interconnection of networks that constitute the internet, whereby the term protected area includes any transactions which are not freely available.

The handling of sensitive data or transactions, excluding unauthorised users from networks, in particular in the freely accessible internet, poses great security problems. On the one hand, access rights must first of all be guaranteed for the transactions, excluding unauthorised users, and on the other hand, a secure transfer of the data must then take place. This invention deals with the first of these problems, namely the checking of whether a terminal which carries out transactions excluding unauthorised users, also has access rights to the same.

A conventional method for identifying a terminal or a user for the supply of a specific service, such as for example, access to protected areas on the internet, is to request a user name and a password. This type of method, whereby a user name and a password are requested, provides a relatively high level of security with regard to the identification of the user. With this method, however, it is necessary for the user to first of all be registered in some form, so as to use a desired area. The consequence of this for the user is that, if required, he must provide personal data for the registration even if he doesn't feel this is justified. Furthermore, users nowadays often write down user names and passwords because they have to administer too many passwords or pins, eg. for accessing their own computers, account card, credit card etc. However, it is well known that this writing down goes hand in hand with a security risk. For the corresponding service provider, this also means that correspondingly efficient customer data administration must be provided, which generally requires manual support.

For the provider of a specific service, it is often not, however, necessary for the receiver of the service to be registered with them in any form. The customer is thus eg. anonymous to the network operator (provider) during open "call by call" or during open "internet by call". The network operator only knows the call-up number, ie. a unique connection identifier of an otherwise anonymous customer, the target call-up number and the length of the call. For invoicing purposes, these data are general communicated to the collection point at the telephone company of the customer, for example Deutsche Telekom AG. Here, the customer can remain fully anonymous to the provider of a specific service, because other than the unique connection identifier, no further information about the customer is required.

If the network operator or the service provider would like, however, to offer the respective customer transactions, excluding unauthorised third parties, for example to make available confidential date—such as a individual connection identification—or make possible access to other protected areas, this was previously only possible with a pre-registration so as to ensure that only authorised terminals could gain access to the respective data.

The aim of this invention, therefore, is to make possible automatic identification of access rights to protected areas in networks, in particular on the internet.

In accordance with the invention, this task is fulfilled with a method for automatic identification of an access right to protected areas in a first network using a unique connection identifier of a second network, in particular in the interconnection of networks that constitutes the internet, with the following procedural steps: dynamic or static assignment of a unique identifier of the first network for a terminal during or prior to the latter's connection to the first network, storage of a combination of at least the unique connection identifier of the second network and the unique identifier of the first network in an authentication unit, questioning of the authentication unit in order to establish the unique connection identifier of the second network using the unique identifier of the first network when the terminal wishes to gain access to the protected area, checking whether an access right exists for the protected area for the unique connection identifier of the second network. This method thus makes possible a secure, automatic identification of access rights to protected area in networks using the identifiers from two different networks. Pre-registration by means of a user name and password and the supply of personal information is not necessary. But even with access to areas which also require registration, such as for example commercial data bases, the method in accordance with the invention also makes it possible for the access to be only to specific network elements, in particular specific telephone connections (both mobile and fixed networks), and this excludes any misuse, even when user names and passwords are lost or knowingly passed on to others.

In accordance with a preferred embodiment of the invention, the combination stored in the current authentication unit contains additional data, such as for example the dial-in number into the network, a user name (login) and/or a password. These data can make better identification of the terminal possible, whereby in particular, the user name and the password can be automatically produced by dialling into the network.

With a particularly preferred embodiment of the invention, the authentication unit is only temporarily run so that it is essentially a dynamic unit. Preferably, the combination of data is deleted from the authentication unit as soon as the terminal ends its connection. In this way it is guaranteed that access to the protected area is only possible for as long as a connection from the unique connection identifier to the network exists.

With one embodiment of the invention given as an example, the unique identifier of the second network is a call-up number. Preferably, the protected area includes the provision of an online individual connection identification so that the user of "call by call" or "internet by call" services can gain access to his connection identifications without having to register in advance. The individual connection identification is provided here automatically for the unique connection identifier of the terminal. With an alternative embodiment of the invention, before the release of a individual connection identification, an additional entry is required on the user's terminal so as to ensure that not every terminal which has access to a specific network element or a specific telephone connection can also call up the connection identifications for this connection. The additional entry comprises, for example, the entry of an invoice and/or customer number of the telephone company, and/or a PIN.

In order to guarantee a high level of security with identification and to prevent misuse of the authentication unit, only authorised services have access to the authentication unit, and these must, if so required, register in advance with the authentication unit and identify themselves when so requested.

With one embodiment of the invention, the protected area includes at least one of the following services: provision of data (commercial data bases), electronic trade (e-commerce) and payment. In the e-commerce area, in general the pre-registration of a customer can not be dispensed with, but the use of the e-commerce services can be made simpler because a terminal can be automatically identified using its connection identifier such as eg. its telephone connection. With the payment service, amounts of money can, for example, be invoiced by means of the customer's telephone bill, eg. the one-off invoicing of a small amount for reading a specific newspaper article on the internet. The costs arising from the payment service are preferably invoiced automatically by means of the unique connection identifier. Here, the method in accordance with the invention makes it possible to subsequently provide exact evidence of the connection established between two network elements, the contact, the order, and if required, the supply of the service provided, even without registration of the respective customer.

With another embodiment of the invention, further data from the terminal are automatically called up and/or further procedural steps are initiated in the protected area using the unique connection identifier of the second network, such as eg. the connection number or SIM card address. The additional data can be provided, for example, from a pre-registration under the unique connection identifier. Such additional data are in particular practical in the e-commerce area where, if required, delivery and invoice addresses have to be given. As further procedural steps, eg. automatic processing of an order can take place. The method in accordance with the invention can also be used in combination with known authentication with user name and password so as to achieve even higher data security.

The task which forms the basis of the invention is also fulfilled with a method for providing data for an automatic identification of access rights to protected areas in networks, in particular in the interconnection of networks that constitutes the internet, with the following procedural steps: provision of at least one respective unique identifier from at least two different networks while a connection to both networks exists, the storage of a combination of the different identifiers in a dynamic authentication unit, issue and/or authentication of one of the unique identifiers with a corresponding enquiry with regard to the other unique identifiers, deletion of the data from the dynamic authentication unit as soon as a connection with at least one of the two networks is ended. The method in accordance with the invention provides a dynamic authentication unit of the terminal currently located in the network which makes possible identification of a terminal using its unique identifier from both networks. The authentication unit here is run in real time so that the stored data are only kept for as long as the terminal is in the network. After the connection has ended, the data are immediately deleted so as to prevent any misuse.

Preferably, at least one of the identifiers is an IP number and/or a unique connection identifier of a terminal.

For increased data security, it is checked that the enquiry with regard to a specific IP number originates from an authorised service. In this way it is ensured that data located in the authentication unit is not improperly used.

For increased data security, data additional to the aforementioned combination are stored in the current authentication unit. These can include, for example, the dial-in number, a user name (login) and a password. These additional data provide further improved identification security.

With one embodiment of the invention, a call-up number block or a target number block can be identified by means of the authentication unit or the identifier issued.

In the following this invention is described in greater detail using a preferred embodiment of the invention given as an example, and with reference to the drawing. In the drawing:

FIG. 1 shows a schematic system overview for an open "internet by call" service of a telecommunications network operator.

Using FIG. 1, the method in accordance with the invention with automatic identification of access rights is described in more detail using the example of an online individual connection identification (EVN) for "internet by call" customers.

First of all, however, the general invoicing mode with an "internet by call" service is described. With an open "internet by call" service the customer, whose connection runs, for example, to Deutsche Telekom AG (DTAG), dials via the DTAG network into the network of a corresponding network operator, hereinafter referred to as the provider. DTAG connects the corresponding call in its network up to a defined hand-over point which is also called the "point of interconnect" (POI). At this POI, the call from DTAG is transferred to the provider of the "internet by call" service. If required, there is now a connection of the call in the network of the operator, and the call is timed on a modem bank of the provider. In so far as is required, the customer data, such as for example a user name and a password are checked and then the customer is allocated a (dynamic) IP address. The call is now further connected to its target destination (eg. the public internet) on the basis of the internet protocol (IP).

The data relevant for invoicing the call are recorded by the provider, and passed on to the collection point at DTAG.

The provider receives information from DTAG concerning which data sets were invoiced under which invoice number (invoice number, customer number and invoice date), without the customer's particulars being known to the provider.

On their invoices, DTAG do not list the individual "internet by call" calls made by the customer, which the latter can, however, request online, as described below.

The system described below with reference to FIG. 1 makes possible an automatic connection-based authentication of a customer so as to make possible access to an online individual connection identification of an "internet by call" provider.

Block 1 in FIG. 1 represents the telecommunications network outside of the provider's network. In block 1, the dialling and the connection of the call as far as the POI of the "internet by call" provider takes place.

The system of the network provider is shown by a box 2 outlined by a broken line in FIG. 1.

Block 4 in FIG. 1 represents a switch in which the data relevant to invoicing the customer are produced. These customer data, which are called "call data records" (CDR) contain eg. the customer's unique connection identifier, the dial-in number into the provider's network, and the start and the end time of the call. These data are further conveyed in the provider's network to a calculation system in block 6 which calculates the costs for the respective call. The calculated costs are communicated to DTAG in block 8, giving the unique connection identifier. DTAG then invoices these costs to the customer of the respective connection of the unique connection identifier, and sends data relating to the invoice back to the calculation system in block 6. These data include, for example, the account number, the customer number and the invoice date. The customer's personal data are not included.

From block 6, the calculated costs together with the CDR data are communicated to an internal network data base server in block 10. This communication can take place immediately or only after receipt of the invoice data by DTAG. If the data are communicated immediately, the invoice data sent back later by DTAG after receipt are communicated subsequently to the data base server 10, which then accumulates and controls these data.

The switch in block 4 conveys a part of the CDR data, namely the unique connection identifier and the dial-in number onto a modem bank in block 12, where the call is timed. From the modem bank in block 12, the data are communicated to a server in block 14. Here, a current IP address for the call is allocated. The current IP address, the corresponding unique connection identifier and the dial-in number are then conveyed on to an authentication unit in block 16. When the call has ended, ie. the connection between the provider's network and the customer is broken, the switch in block 4 informs the modem bank in block 12 that the call has ended. The corresponding space on the modem bank is released, and the modem bank informs the server in block 14, giving the corresponding IP address, that the call has ended. The server in block 14 once again transfers this information immediately to the authentication unit in which the data from the IP address, the unique connection identifier and the dial-in number are immediately deleted. The authentication unit thus contains a dynamic data base in which respectively only current authentication data are stored, ie. data relating to a current connection between a customer connection (unique connection identifier) and a dial-in point of the network (dial-in number) and the dynamically assigned IP address. This specific combination of data is only stored for as long as an actual connection to a customer connection exists.

If a customer would like to see his invoice data online, he will call up the corresponding internet page in the provider's network which has access to the data base server in block 10 via a web interface in block 20. By means of the web interface, the data base server 10 is informed of the currently assigned IP number of the customer, not, however, the unique connection identifier of the same. The data base server in block 10 therefore makes an enquiry to the authentication unit in block 16 so as to establish whether the customer's IP address used during the enquiry represents a current IP address, and furthermore, to which connection, ie. to which unique connection identifier the IP address is assigned. If it is a current IP address, the data combination is sent from the authentication unit to the data base server in block 10, and the data base server can now filter out the individual connection identifications corresponding to the unique connection identifier and release them for inspection. If required, additional information, such as for example a PIN and/or an invoice number and/or a DTAG customer number can also be requested so as also only to make the information relating to the individual connection identification available to the person or the terminal which actually has access to the DTAG invoice.

The essential feature for secure, connection-based identification of a terminal is the provision of the dynamic authentication unit which only contains data for currently existing connections, and so offers a high level of security against misuse.

Although this invention was described especially using an online individual connection identification, the connection-based authentication of access rights can, of course, also be extended to other areas. For example, any internal network or also external network service could access the authentication unit so as to establish whether and to which telephone connection (unique connection identifier) a specific IP address is currently assigned. The unique connection identifier permits a connection-based authentication by means of the respective service. Of course only specific registered services can gain access to the authentication unit, and they must also be respectively identified so as to prevent any misuse of the authentication unit.

This type of service is, for example, payment services which invoice amounts by means of a corresponding collection system with DTAG's telephone bill. This type of invoicing takes place, for example, when reading specific newspaper articles on the internet where a fee is payable. Proof of the connection having been made, the order, the supply as well as the implementation of payment claims and supply obligations is thus possible using the above authentication method, even with "anonymous" end customers.

Another possibility for the use of a connection-based authentication is identification by e-commerce providers. When placing orders with or making enquiries of e-commerce providers, these can automatically carry out a connection-based authentication, and so clearly allocate orders. This is particularly beneficial when buying virtual products (eg. digital books, sound and film recordings), because the delivery address here does not represent any control. Further authentication by means of user name and password can then be dispensed with, or used in addition, so as to offer a still higher level of security. Using connection-based authentication, the e-commerce provider can then call up further relevant customer data provided the customer is registered with the unique connection identifier.

E-commerce providers, and also providers of other contents, can block different unique connection identifiers with the network operator so as to prevent further transactions being made from these connections. In this respect, connection-based authentication provides protection against misuse.

Another example where connection-based authentication can be of particular use is registration with specific services by means of the unique connection identifier. The customer can, for example, clear his connection for specific services, and thereupon receives an automatically produced code which in the future he adds to the dial-in number in subsequent dialling processes. Using this code, a specific set of services can be assigned to the corresponding unique connection identifier which have been approved for this unique connection identifier (eg. only online tariff services, no XXX services).

With an online authorisation process, the user or a terminal can also be securely identified so as to avoid misuse. In many cases, the connection-based identification can replace an electronic signature, and also makes possible the transfer of payment models known from the telephone networks to the data networks.

Connection-based identification makes it possible in general to make available contents, excluding third parties, without any further authentication, and to block contents for unique connection identification. Using the connection technical information, it can also be checked whether a particular service is expedient for this connection. There is no sense in transferring a videostream to a GSM mobile, whereas this can be expedient for a UMTS terminal or a fixed net connection with terminal.

This invention is not limited to the precise embodiment described and the above-specified examples. Rather in general it provides automatic authentication of a terminal in networks, in particular in the interconnection of networks that constitutes the internet, whereby at least two identifiers from at least two different networks are used. This authentication can be used for different purposes.

The invention claimed is:

1. Method for automatically identifying an access right to protected areas in a first network using a unique connection identifier of a second network, comprising the following procedural steps:
   dynamic or static assignment of a unique identifier of the first network for a terminal, during or prior to the latter's connection to the first network by means of the second network;
   storage of a combination of at least the unique connection identifier of the second network by means of which the connection was made, and the unique identifier of the first network in an authentication unit;
   a provider of the protected area requesting the authentication unit to determine the unique connection identifier of the second network using the unique identifier of the first network when the terminal would like access to the protected area;
   authenticating the unique connection identifier of the second network and/or communicating the unique connection identifier of the second network to the provider of the protected area by means of the authentication unit; and
   checking whether an access right for the protected area exists for the unique connection identifier of the second network.

2. Method in accordance with claim 1, wherein the combination stored in the current authentication unit contains further data in addition.

3. Method in accordance with claim 2, wherein the additional data has at least one of the following:
   the dial-in number into the first network, a user name (login) and a password.

4. Method in accordance with claim 1, wherein the authentication unit is only run temporarily.

5. Method in accordance with claim 4, wherein the combination of data is deleted from the authentication unit as soon as the terminal ends its connection with one of the two networks.

6. Method in accordance with claim 1, wherein the unique identifier of the second network is a call-up number.

7. Method in accordance with claim 1, wherein the protected area includes the provision of an online individual connection identification.

8. Method in accordance with claim 7, wherein an individual connection identification takes place automatically for the unique connection identifier of the second network.

9. Method in accordance with claim 7, wherein, before release of an individual connection identification, a further entry on the terminal is necessary.

10. Method in accordance with claim 9, wherein the further entry includes the entry of an invoice number and/or a customer number and/or a PIN.

11. Method in accordance with claim 1, wherein only authorized services have access to the authentication unit.

12. Method in accordance with claim 1, wherein the protected area includes at least one of the following services:
   provision of contents, electronic trade (e-commerce), payment or settlement services and authorized services.

13. Method in accordance with claim 12, wherein with a payment service, the costs arising are automatically invoiced by means of the unique connection identifier of the second network.

14. Method in accordance with claim 1, wherein further data are automatically called up from the terminal and/or further procedural steps are initiated in the protected area using the unique connection identifier of the second network.

15. Method in accordance with claim 1, wherein further personalization of the terminal takes place by entering a PIN.

16. Method for providing data for automatic identification of access rights to protected areas in networks, comprising the following procedural steps:
   provision of at least one unique identifier respectively from at least two different networks while a connection to both networks exists, whereby the connection to one of the networks happens by means of the other network;
   storage of a combination of the unique identifiers in an authentication unit;
   authenticating and/or issuing of one of the unique identifiers when a corresponding enquiry is made regarding an other of the unique identifiers; and
   deletion of data from the authentication unit as soon as a connection with at least one of the two networks has ended.

17. Method in accordance with claim 16, wherein at least one of the identifiers is an IP number and/or a unique connection identifier of a terminal.

18. Method in accordance with claim 16, wherein it is checked whether the enquiry originates from an authorized place or from an authorized service.

19. Method in accordance with claim 16, wherein the combination stored in the current authentication unit contains further information in addition.

20. Method in accordance with claim 19, wherein the additional data have at least one of the following: a dial-in number into one of the networks, a user name (login) and a password.

21. Method in accordance with claim 16, wherein a call-up number block or a target number block is identified by means of the authentication unit.

22. Method in accordance with claim 1 or 16, wherein the first and second networks are based on different protocols.

23. Method in accordance with claim 1 or 16, wherein the first network is the internet, and the second network is a telephone network.

* * * * *